United States Patent [19]

Cunningham, Jr.

[11] Patent Number: 5,421,938
[45] Date of Patent: Jun. 6, 1995

[54] CIRCULAR DUCT AND APPARATUS AND METHOD OF FABRICATION

[75] Inventor: Robert A. Cunningham, Jr., Argyle, Tex.

[73] Assignee: Glass Master Corporation, San Antonio, Tex.

[21] Appl. No.: 958,575

[22] Filed: Oct. 8, 1992

Related U.S. Application Data

[63] Continuation of Ser. No. 758,120, Sep. 12, 1991.

[51] Int. Cl.⁶ ............................................. B29C 53/00
[52] U.S. Cl. ................................. 156/217; 156/218; 156/257; 156/304.5; 83/875; 493/295
[58] Field of Search ............ 156/257, 218, 215, 304.5, 156/556, 217; 83/877, 341, 487, 492, 496, 497, 614, 875; 30/140, 316; 493/287, 295, 355, 366, 137

[56] References Cited

U.S. PATENT DOCUMENTS

| | | | |
|---|---|---|---|
| Re. 24,613 | 3/1959 | Hageltorn | 156/304.5 |
| 1,303,687 | 5/1919 | Leffler | 156/304.5 |
| 2,178,984 | 11/1939 | Zimmerman | 156/304.5 |
| 3,038,217 | 6/1962 | Harris | 156/304.5 |
| 3,605,534 | 5/1967 | Barr | 83/5 |
| 3,706,246 | 12/1972 | Keith | 83/7 |
| 4,005,738 | 2/1977 | Strange | 144/136 |
| 4,070,954 | 1/1978 | Cailey | 93/36.9 |
| 4,411,183 | 10/1983 | Auer | 83/581 |
| 4,608,902 | 9/1986 | Ivey | 83/875 |
| 4,951,539 | 8/1990 | Buckner | 83/884 |
| 5,134,917 | 8/1992 | Holland | 83/877 |

FOREIGN PATENT DOCUMENTS 0161117 11/1981 Japan .................................. 156/257

Primary Examiner—W. Gary Jones
Assistant Examiner—Mark DeSimone
Attorney, Agent, or Firm—M. H. Gay

[57] ABSTRACT

A round duct and apparatus and method of forming the duct in which the side edges of the duct are formed to interlock when the duct is folded and the flap is secured in place to provide support when the finishing duct tape is applied to seal the flap and complete the joint.

25 Claims, 4 Drawing Sheets

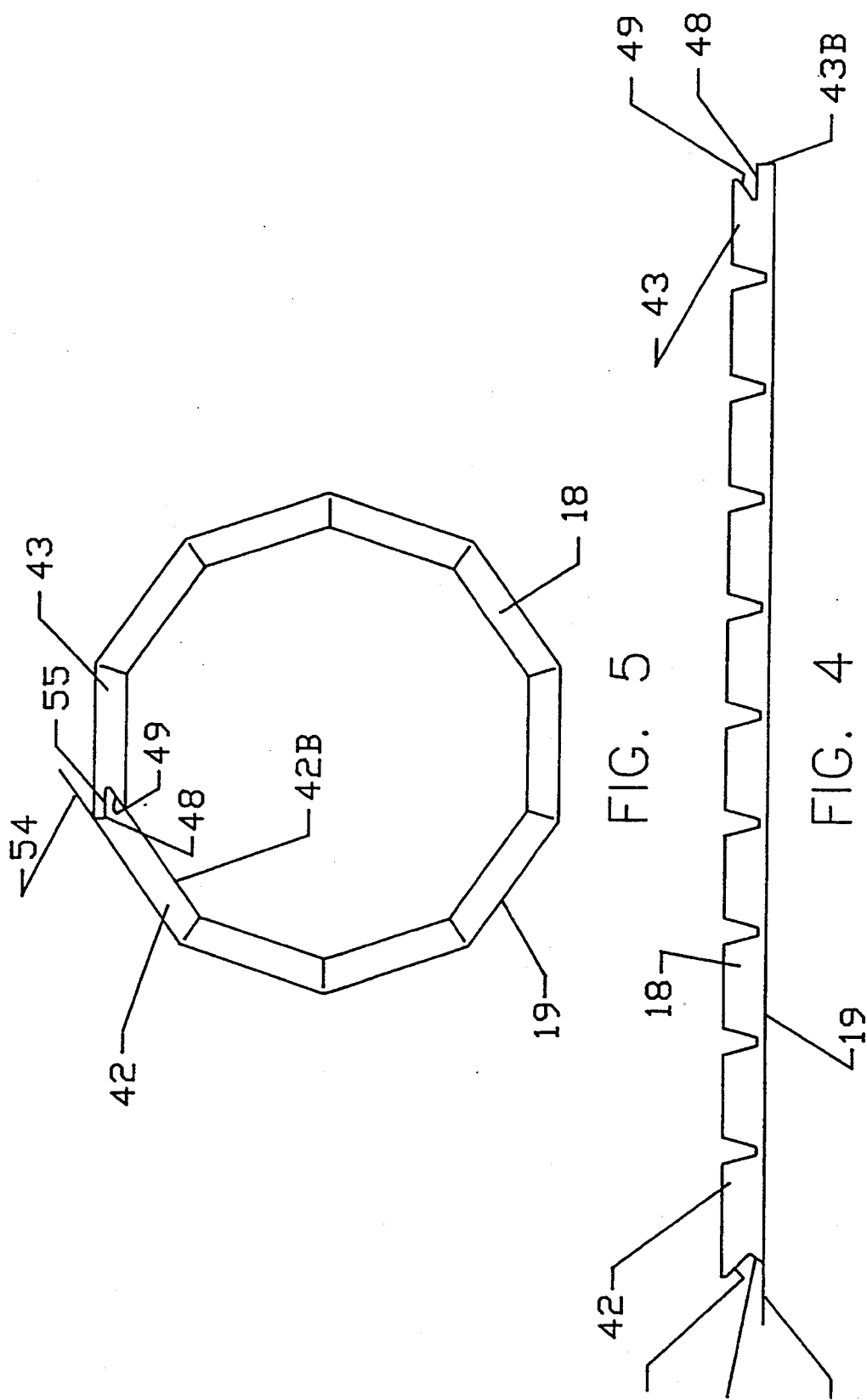

CIRCULAR DUCT AND APPARATUS AND METHOD OF FABRICATION

This application is a continuation of my copending application Ser. No. 07/758,120 filed Sep. 12, 1991.

This invention relates to circular duct fabricated from duct board and apparatus for fabricating the duct and methods of fabrication thereof.

Ducts have been fabricated from duct board, that is, insulation material having a facing on one side of a vapor barrier of impermeable material. Conventionally duct board is formed of resin impregnated fiberglass with an impermeable barrier of foil. The duct board conventionally is provided in sheets, with a shiplap at opposite ends for joining ducts together.

It is desirable to fabricate ducts in a generally circular form with many flat sides, such as 10 flat sides. A problem is encountered with circular duct in fastening the foil closure flap, as the duct is not sufficiently rigid to support the pressure desired in wiping the duct tape over the closure joint. This is particularly true when it is desired to close the joint by passing the duct through a machine. In fact, no known machine is available for closing round duct. It is believed that this is due to the difficulty in applying the duct tape to the closure joint.

It is an object of this invention to provide a circular duct and apparatus for and method of fabrication thereof which has sufficient rigidity to support the pressure desired in applying duct tape.

It is another object to provide a circular duct and apparatus for and method of its fabrication, which may be closed by a machine.

Another object is to provide a circular duct and apparatus for and method of fabrication thereof in which the desired rigidity is provided by the configuration of the closure joint.

Other objects, features, and advantages of this invention will be apparent from the specification, the drawings and the claims.

In the drawings wherein an illustrative embodiment of this invention is shown and wherein like reference numerals indicate like parts:

FIG. 4 is a schematic end view of a duct board having ten sections fabricated by passing through the machine;

FIG. 5 is a schematic end view of a duct formed by arranging the board of FIG. 4 in circular configuration with the flap extending free;

Duct board cutting machines are old and well known. Any desired basic machine may be used in practicing this invention by installing blades of the desired configuration. For instance the machine of U.S. Pat. No. 3,605,534 may be used. This patent is incorporated herein in its entirety by reference.

Figure 1:
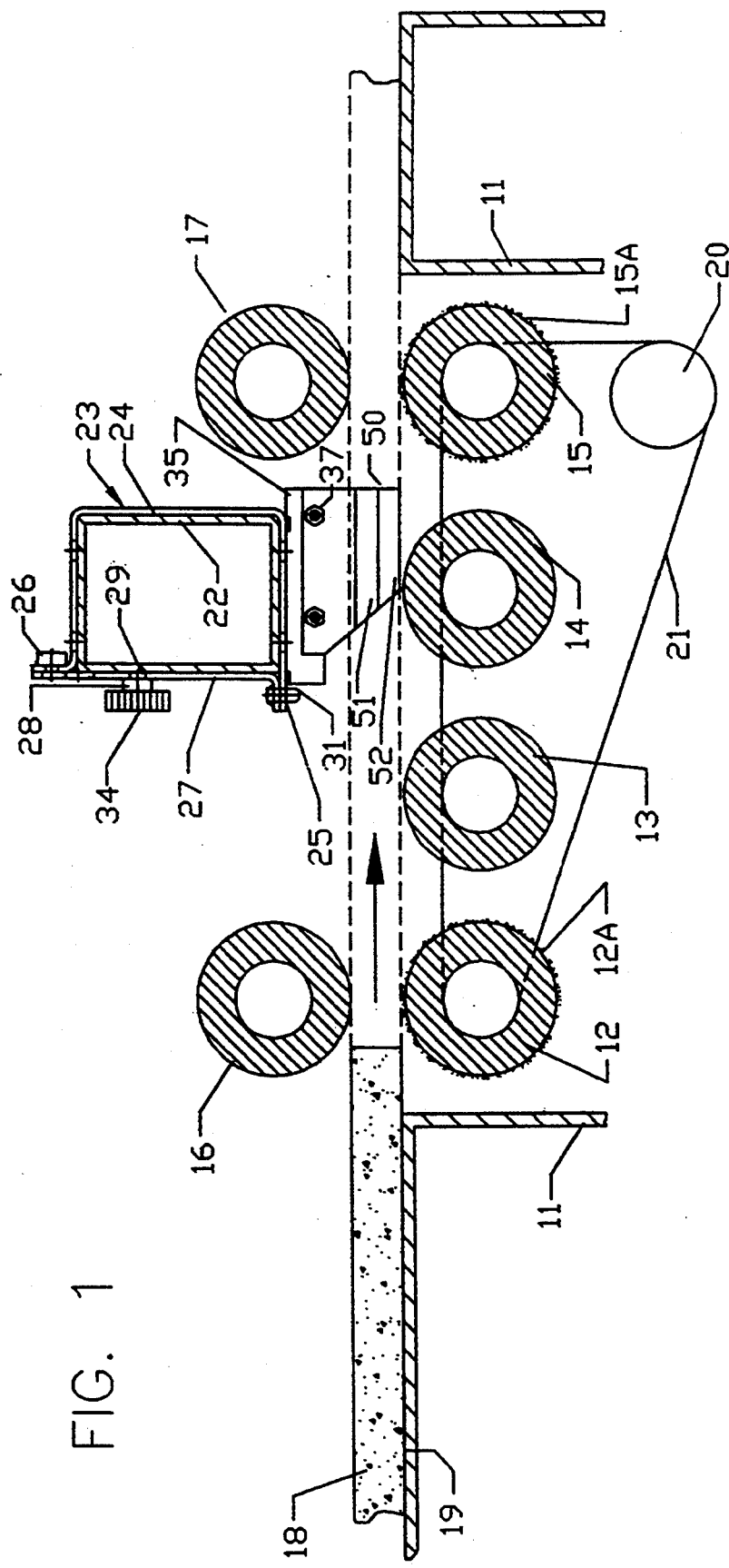
FIG. 1 is a schematic view in section through a machine constructed in accordance with this invention.

FIG. 1 illustrates a machine having a frame 11 supporting a plurality of lower rollers 12, 13, 14 and 15 as well as upper rollers 16 and 17. These rollers are conventionally fabricated of pipe and may have any desired covering thereon to grip the board and move it through the machine. Preferably a thin coating of resilient material covers the rollers and particles of material such as shown at 12a and 15a may be imbedded in the coating on some or all of the rollers to improve friction between the rollers and board. The board may be a conventional insulation duct board having resin impregnated fiberglass insulation material 18 faced on one side with a vapor barrier such as foil 19. Conventionally the leading and trailing edges of the board will have shiplap joints for joining runs of duct. For clarity of disclosure in the drawings these shiplap joints have been omitted.

A motor 20 drives the rollers through the drive connection 21 which may be a chain trained over sprockets (not shown) carried on each of the lower rollers. The drive connection may also drive the upper rollers as shown in the 534' patent.

Figure 2:
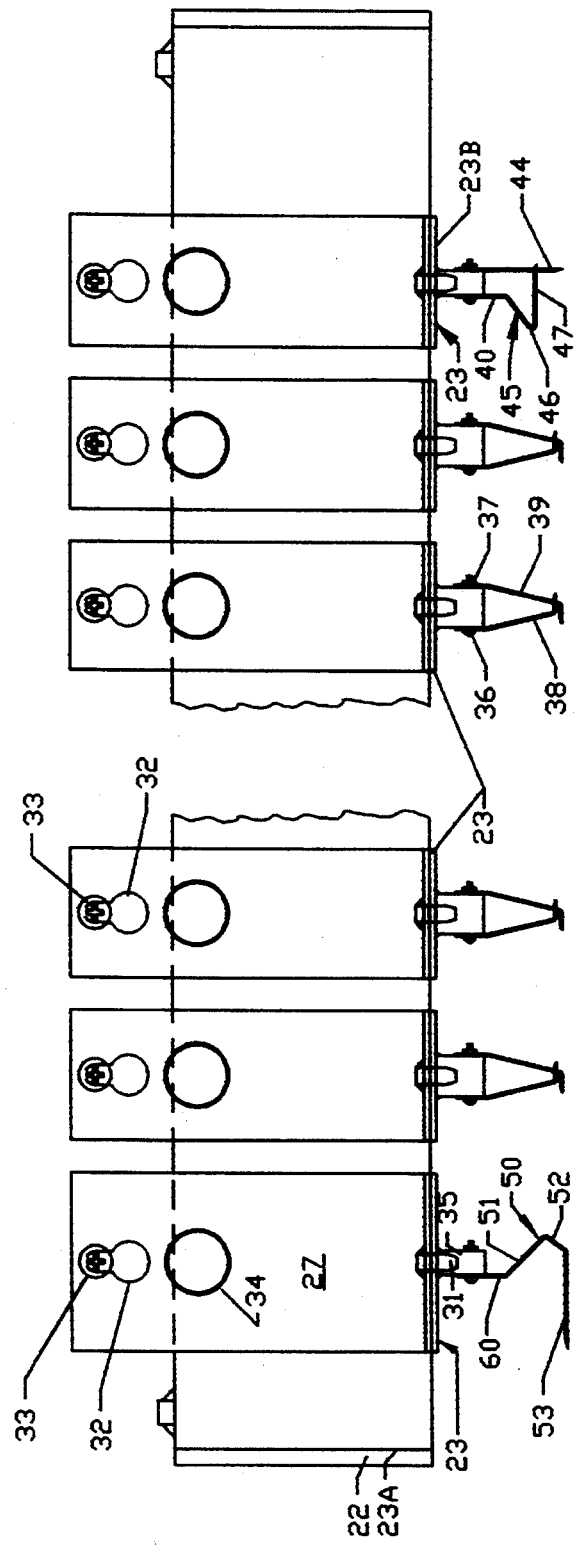
FIG. 2 is a schematic view in front elevation of the tool bar of the machine, blade supports and blades mounted thereon.

A tool bar 22 extends across the machine in the conventional manner and blade supports indicated generally at 23 are mounted on the bar. The blade supports may take any desired form. In the illustrated embodiment a C-shaped tool body 24 is supported on the bar. The body has a vertical hole 25 in its lower leg and a nut 26 is carried on the upper leg with its bore extending horizontally. A face plate 27 carries a nut 28 over a hole 29. At its lower end the face plate has a pin 31 which extends into hole 25 in the lower leg of the body. At its upper end the face plate has keyhole slot 32 in its upper end for engagement with a bolt 33 received in nut 26 on the upper leg of the body 24. The bolt 33 is shown in FIG. 2 and omitted from FIG. 1 for clarity of illustration. Thus, the body may be slipped over the tool bar and the face plate moved downward with the bolt 33 in the keyhole and the pin 31 inserted into the hole 25. The bolt 34 may then be tightened to secure the face plate to the body. The blade support is then positioned along the tool bar in the proper place to make the desired cut. Then the bolt 34 carried in the nut 28 on the face plate tightened against the tool bar to lock the blade support on the tool bar.

The number of blade supports employed depends upon the number of sides in the desired duct. The duct will have at least five sides. The outside blade supports, that is supports 23a and 23b will carry the special blade means of this invention. The interior blade supports 23 will carry conventional V-blades to make V-cuts in the board with the apex of the V adjacent the barrier 19 to permit the board to be formed in a circular configuration with the insulation material of adjacent sections in contact.

To support the cutting blades the support body 24 has a bar 35 secured to the underside of its lower leg as by welding and the cutter blades are secured to the bar by bolts 36 extending through the cutter blades and bar. Nuts 37 on the bolts fasten the blades to the bar.

Figure 3:
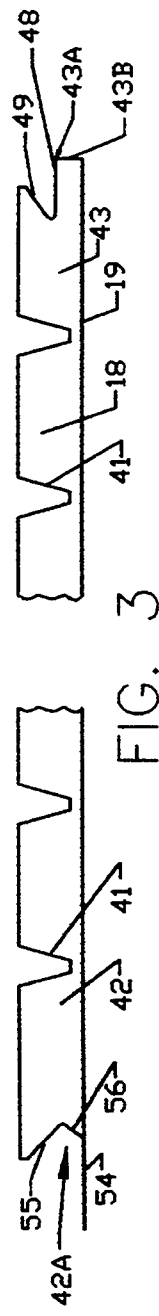
FIG. 3 is a schematic end view of a duct board fabricated by passing it through the machine arranged with each cut in the board adjacent the knife making the cut.

Preferably the V-blades are formed by double cutters 38 and 39 which are conventional in form and extend downwardly and inwardly in a V configuration and terminate in inturned horizontal tips to make V-cuts 41 in the insulation material 18 with the apex of the V adjacent the barrier 19 as shown in FIG. 3.

The left most V-cut results in a flap section 42 on the left side of the board as viewed in FIG. 3. In like manner the right most V-cut results in a notched section 43 on the right side of the board. In accordance with this invention the flap and notched sections are fabricated to provide the desired strength in joining these two sections to permit the application of the desired pressure in applying the duct tape to the joint.

FIGS. 2 through 5 illustrate the preferred form of the invention. The blade support 23b carries a conventional cut off blade 44 to cut the board to the desired width and in doing so cuts the end face 43b in the free side edge of the notch section. The support 23b also carries a special blade indicated generally at 45 for forming the configuration of the free side edge indicated generally at 43a of the notch section 43. This blade has a section 40 for attachment to the bar 35, an angled section 46 and terminates in a horizontal section 47. For a ten sided duct the angled section may have an angle of 126 degrees in one direction with the section of the blade fastened to the carrier block. The free end 47 of the blade extends horizontally. Thus the V formed by the sections 46 and 47 may be 54 degrees. The blade section is preferably adjusted in height in the machine to cut at approximately the mid point in the thickness of the insulation material. Thus the blade will form the leg 48 of the V-cut to extend horizontally at the mid point in the thickness of the insulation material. The blade section 46 will form the leg 49 of the V-cut in the insulation material. As will appear more fully hereinafter the angle of the leg 49 is selected to be parallel to the interior face of the flap section 42 when the duct is in its circular configuration and to engage this face. The leg 48 may be at any desired angle.

The free side edge indicated generally at 42a of the flap section 42 is formed by the blade means indicated generally at 50 and carried by blade support 23a. This blade means removes insulation material to provide a flap and forms the free side edge indicated generally at 42a of the flap section 42 to conform to the configuration of the free side edge 43a of the notched section. Thus this blade means depends vertically from the bar of the carrier 23a and has a section 60 for attachment to bar 35 and a section 51 extending away from the side of the machine at an angle to the vertical in one direction. The blade continues with a section 52 extending at an angle to the vertical but in the opposite direction or toward the side of the machine. The blade terminates in section 53 extending horizontally to remove insulation material and form flap 54. For 10 sided duct, preferably the blade section 51 forms an angle of 54 degrees with the vertical and blade section 52 extends at an angle of 90 degrees with blade section 51. Thus a V-notch is cut in the free side edge of the flap section with blade section 51 cutting the insulation material at 55 and blade section 52 cutting the insulation material at 56.

The resulting V-cuts in the flap section 42 and the notch section 43 open away from each other and are formed on angles which permit the notch and flap sections to engage and provide support for the joint when the duct is formed. The relationship is shown in FIG. 5. As shown the notch section V-leg 49 extends parallel to the interior face 42b of the flap section and is in engagement therewith. The leg 55 of the V-cut in the flap section is parallel to the surface 48 in the notch section and in engagement therewith. The leg 56 of the V-cut in the flap section is parallel to the end 43b of the free side edge of the notch section and in engagement therewith.

With the board formed in the circular configuration shown in FIG. 5 the flap 54 may be stapled to the notch section 43 in the conventional manner. As the several surfaces of the insulation material on the notch and flap sections engage in an interlocking manner the joint formed between the flap and notch sections will support the duct during the wiping of the closure tape over the closure flap 54 in the conventional manner.

Figures 6, 7:
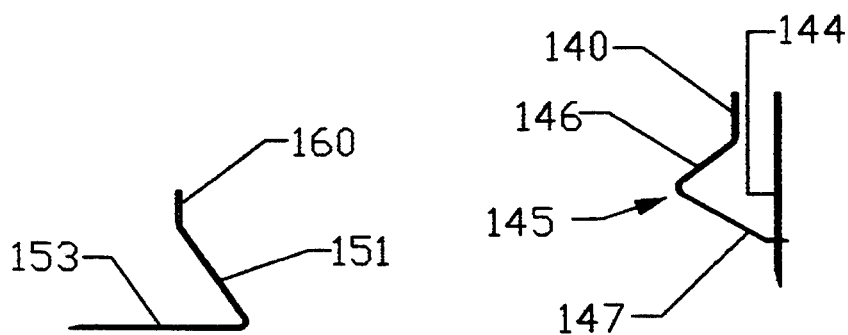
FIG. 6 is a schematic end view of a cutter blade.
FIG. 7 is a schematic end view of two related cutter blades.
Figure 8:
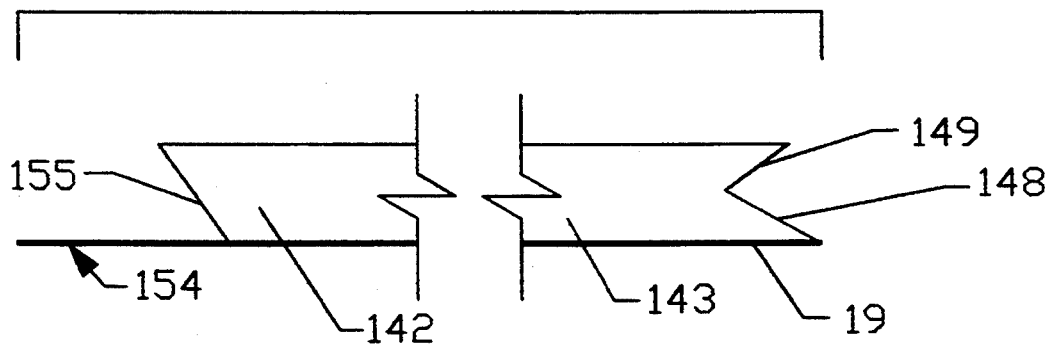
FIG. 8 is a schematic end view of the two side sections of a duct board formed by the cutters of FIGS. 6 and 7.

FIGS. 6 through 9 illustrate an alternate form of this invention. The blade shown in FIG. 6 is carried by blade support 23a and the blades shown in FIG. 7 are carried by blade support 23b. They make the cuts shown in FIG. 8 in the flap and notch sections of the board being processed. The blade 144 cuts the board to the desired width. The V-shaped blade indicated generally at 145 has an attachment section 140 and has a section 146 which forms the surface 149 in the free side edge of notch section 143. As with blade 46, the blade 146 preferably makes a cut parallel to the inner face 142b of the flap section so that these surfaces may engage when the duct is folded into circular configuration. The blade section 147 forms the surface 148 in the notch section. The surface 148 extends to the barrier 19.

The blade of FIG. 6 has an attachment section 160, an angled section 151 and a section 153 extending horizontally. The blade section 151 forms the surface 155 in the free side edge of the flap section. The angle of blade section 151 is selected to provide a cut 155 which is a mirror image of surface 148 on the notch section so that these surfaces may fully engage. The blade section 153 remove insulation material and forms flap 154. In both illustrated forms of the invention the flap is shown to be free of insulation material. In practice a small amount of insulation material may be left on the flap as is conventional with many flap cutting blades.

Figure 9:
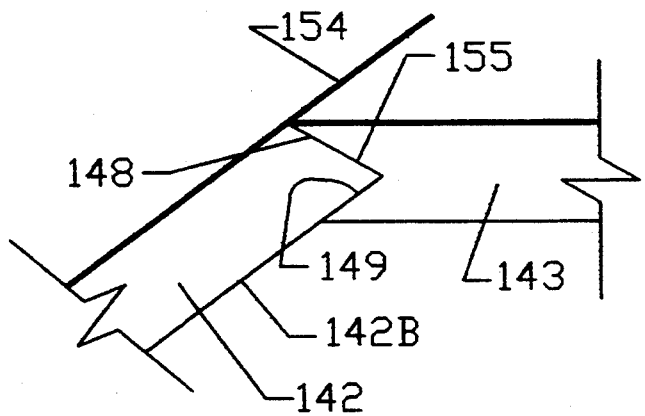
FIG. 9 is a schematic view of the two side sections of FIG. 8 with the board arranged in circular configuration with the two side section in engagement and before the flap is attached.

When the board is folded into a circular configuration as shown in FIG. 9 the surfaces 148 and 155 will engage. Surface 149 will engage the interior surface 142b of the flap section. With the free side edges of the flap and notch sections in firm engagement the flap may be attached to the barrier on the notch section in the conventional manner to complete the duct. Again the several surfaces engage in an interlocking manner to provide support when the sealing tape is applied over the flap 154 to seal it to the notch section 143.

The foregoing disclosure and description of the invention are illustrative and explanatory thereof and various changes in the method and apparatus and system and in the size, shape and materials, as well as in the details of the illustrated construction of the duct, may be made within the scope of the claims without departing from the spirit of the invention.

What is claimed is:

1. An air duct comprising:
a generally circular duct having multiple flat sides constructed from insulating board having a moisture barrier on one side,
said duct having at least 4 V-shaped grooves in the insulation of a flat duct board with the bottom of the V grooves adjacent the barrier providing on one side of the board a flap section and on the other side of the board a notch section,
a V-shaped notch in the insulation material of the free side edge of the notch section with the leg of the V remote from the barrier extending parallel to the interior face of the flap section when the board is formed into a circular configuration, said flap section having a flap on its free side edge and having its free side edge insulation material formed in a mirror image of the insulation material of the free side edge of the notch section on the barrier side of the apex of the V-shaped cut in the notch section, said board formed in a circular configuration with the flap and notch sections in engagement and the flap fastened to the notch section to form a duct, said board constructed and arranged such that the two side edges of the duct board will interlock when the cut duct board is formed into circular configuration with the two side edges in engagement.

2. The duct of claim 1 wherein said duct is formed with 10 flat sides.

3. The duct of claim 1 wherein the notch in the notch section extends across substantially the full thickness of the insulation material.

4. The duct of claim 1 wherein the notch in the notch section is provided in the one half of the thickness of the insulation material remote from the barrier.

5. The duct of claim 1 wherein the leg of the V-shaped notch in the notch section which is adjacent the barrier extends approximately parallel to the barrier on the notch section.

6. The duct of claim 1 wherein:
the notch in the notch section is provided in the one half of the thickness of the insulation material remote from the barrier,
the leg of the V-shaped notch in the notch section which is adjacent the barrier extends approximately parallel to the barrier on the notch section, and
the edge of the insulation material of the notch section between the barrier and the notch therein extends approximately perpendicular to the barrier.

7. The method of forming a generally circular duct having multiple flat sides from a duct board of insulating material having a moisture barrier on one side comprising:
cutting the board to the desired width,
cutting at least 4 V-shaped grooves in the insulating material with the bottom of the V-grooves adjacent the barrier to form a flap section and a notch section on opposite sides of the board and at least three intermediate sections,
cutting a V-shaped notch in the insulation material of the free side edge of the notch section with the leg of the V remote from the barrier extending parallel to the interior face of the flap section when the board is formed into a circular configuration,
cutting away insulation material from the free side edge of the flap section to provide a flap and to form the insulation material adjacent the flap in a mirror image of the insulation material of the free side edge of the notch section on the barrier side of the apex of the V-shaped notch in the notch section, and
forming the cut board into a circular configuration with the flap and notch sections in engagement and fastening the flap to the notch section to provide a duct,
said method resulting in a cut board in which the two side edges of the duct board will interlock when the board is formed into circular configuration with the flap and notch sections in engagement.

8. The method of forming a generally circular duct having multiple flat sides from a duct board of insulating material having a moisture barrier on one side comprising:
cutting the board to the desired width,
cutting at least 4 V-shaped grooves in the insulating material with the bottom of the V-grooves adjacent the barrier to form a flap section and a notch section on opposite sides of the board and at least three intermediate sections,
cutting a V-shaped notch in the insulation material of the free side edge of the notch section with the leg of the V adjacent the barrier extending approximately parallel to the barrier on the notched section and the leg of the V remote from the barrier extending parallel to the interior face of the flap section when the board is formed into a circular configuration,
cutting away insulation material from the free side edge of the flap section to provide a flap and to form the insulation material adjacent the flap in a mirror image of the insulation material of the free side edge of the notch section on the barrier side of the apex of the V-shaped notch in the notch section, and
forming the cut board into a circular configuration with the flap and notch sections in engagement and fastening the flap to the notch section to provide a duct,
said method resulting in a cut board in which the two side edges of the duct board will interlock when the board is formed into circular configuration with the flap and notch sections in engagement.

9. The method of claim 8 wherein said duct is formed by cutting 9 V-shaped grooves to provide 10 flat sides.

10. The method of claim 8 wherein the notch cut in the notch section is cut in substantially one half the thickness of the insulation material remote from the barrier.

11. The method of claim 10 wherein said duct is formed by cutting 9 V-shaped groves to provide 10 flat sides.

12. The Method of claim 8 wherein the notch cut in the notch section is cut in substantially the full thickness of the insulation material.

13. A blade for cutting duct board comprising:
a first section adapted to be secured to a blade support,
a second section extending from the first section at approximately a 54 degree angle in a first direction,
a third section extending from the second section at approximately a 90 degree angle to the second section in the opposite direction, and
a forth section extending from said third section at approximately a 54 degree angle to said third section in said opposite direction.

14. A blade for cutting duct board comprising;
a first section adapted to be secured to a blade support,
a second section extending from the first section at approximately a 54 degree angle to the first section, and a third section extending from the second section at an angle perpendicular to the first section and in the opposite direction to the second section.

15. The air duct of claim 1 wherein the duct is fabricated on apparatus comprising;

a frame, a plurality of rollers for moving a duct board to be cut through the machine, means for rotating the rollers, tool bar means extending across the machine parallel to the rollers, a support roller below the tool bar means, at least six cutter blade supports on the tool bar including at least 4 interior and 2 exterior supports, V-cut blade means on each of the interior blade supports spaced from said support roller, one exterior blade support having a blade means with a horizontally extending blade section and a V-shaped blade section for cutting free a section of foil from insulation material to provide a closure flat and a V-shaped notch in the side edge of the insulation material of said duct board, and the other exterior blade support having a blade means with a vertically extending blade section for cutting through the duct board and a V-shaped blade section for cutting a V-shaped notch in the side edge of insulation material of said board, said V-shaped blade sections carried by the two exterior blade supports opening away from each other and constructed and arranged such that the cut side edges of the duct board will interlock when the cut duct board is formed into circular configuration with the cut side edges in engagement.

16. Apparatus for fabricating a circular duct from duct board fabricated of insulating material and having a moisture barrier on one side comprising:

a frame;

a plurality of rollers for moving a duct board to be cut through the machine, means for rotating the rollers, tool bars means extending across the machine parallel to the rollers, a support roller below the tool bar means, at least six cutter blade supports on the tool bar including at least 4 interior to 2 exterior supports, V-cut blade means on each of the interior blade supports spaced from said support rollers, one exterior blade support having a blade means with a horizontally extending blade section means and a V-shaped blade section means for cutting free a section of foil from insulation material to provide a closure flat and a V-shaped notch in the side edge of the insulation material of said duct board, and the other exterior blade support having a blade means with a vertically extending blade section means for cutting through the duct board and a separate V-shaped blade section means for cutting a V-shaped notch in the side edge of insulation material of said board, said V-shaped blade section means carried by the two exterior blade supports opening away from each other and constructed and arranged such that the cut side edges of the duct board are mirror images and will interlock when the cut duct board is formed into circular configuration with the cut side edges in engagement.

17. The apparatus of claim 16 wherein the blade means on said one exterior blade support comprises;

a first section adapted to be secured to said one blade support, a second section extending from the first section at approximately a 54 degree angle in a first direction, a third section extending from the second section at approximately a 90 degree to the second section in the opposite direction, and a forth section extending from said third section at approximately a 54 degree angle to said third section in said opposite direction.

18. The apparatus of claim 16 wherein the blade means on said other exterior blade support comprises;

a first section adapted to be secured to said other blade support, a second section extending from the first section at approximately an 54 degree angle to the first section, and a third section extending from the second section at an angle perpendicular the first section and in the opposite direction to the second section.

19. The method of claim 7 wherein the method is practiced on an apparatus comprising;

a frame, a plurality of rollers for moving a duct board to be cut through the machine, means for rotating the rollers, tool bar means extending across the machine parallel to the rollers, a support roller below the tool bar means, at least six cutter blade supports on the tool bar including at least 4 interior and 2 exterior supports, V-cut blade means on each of the interior blade supports spaced from said support roller, one exterior blade support having a blade means with a horizontally extending blade section and a V-shaped blade section for cutting free a section of foil from insulation material to provide a closure flat and a V-shaped notch in the side edge of the insulation material of said duct board, and the other exterior blade support having a blade means with a vertically extending blade section for cutting through the duct board and a V-shaped blade section for cutting a V-shaped notch in the side edge of insulation material of said board, said V-shaped blade sections carried by the two exterior blade supports opening away from each other and constructed and arranged such that the cut side edges of the duct board will interlock when the cut duct board is formed into circular configuration with the cut side edges in engagement.

20. The apparatus of claim 16 wherein there are nine interior blade supports.

21. The apparatus of claim 16 wherein the blade means of said one exterior blade support cuts a V-shaped notch extending across substantially the entire thickness of the insulation material and the blade means of the other exterior blade support cuts a V-shaped notch in the approximately one-half of the insulation material remote from the foil.

22. The apparatus of claim 21 wherein there are nine interior blade supports.

23. Apparatus for fabricating circular duct from duct board fabricated of insulating material and having a moisture barrier on one side comprising:

a frame, a plurality of rollers for moving a duct board to be cut through the machine, means for rotating the rollers, tool bar means extending across the machine parallel to the rollers, a support roller below the tool bar means, at least six cutter blade supports on the tool bar including at least four interior and two exterior supports, V-cut blade means on each of the interior blade supports spaced from said support roller, one exterior blade support having a blade means with a V-shaped section means with one leg of the V extending horizontally for cutting a V-shaped notch in the side edge of the insulating material of said duct board, the other exterior blade support having a blade means with a vertically extending blade section means for cutting through the duct board and a V-shaped blade section means for cutting a V-shaped notch in the side edge of the insulation material of said duct board, said V-shaped blade section means carried by the two exterior blade supports opening away from each other and constructed and arranged such that the cut side edges of the duct board will interlock when the cut duct board is formed into circular configuration with the cut side edges in engagement.

24. Apparatus for fabricating circular duct from duct board fabricated of insulating material and having a moisture barrier on one side comprising:

a frame, a plurality of rollers for moving a duct board to be cut through the machine, means for rotating the rollers, tool bar means extending across the machine parallel to the rollers, a support roller below the tool bar means, at least six cutter blade supports on the tool bar including at least four interior and two exterior supports, V-cut blade means on each of the interior blade supports spaced from said support roller, one exterior blade support having a blade means with a horizontally extending section means to cut a flap and a section means forming an acute angle with the horizontally extending section means for cutting a V-shaped notch in the side edge of said duct board, and the other exterior blade support having a blade means with a vertically extending blade section means for cutting through the duct board and a V-shaped blade section means for cutting a V-shaped notch in the side edge of insulation material of said duct board, said blade means carried by said one exterior blade support and said V-shaped blade section means carried by the other exterior blade support opening away from each other and constructed and arranged such that the cut side edges of the duct board will be mirror images and interlock when the cut duct board is formed into circular configuration with the cut side edges in engagement.

25. Apparatus for fabricating a circular duct from duct board fabricated of insulating material and having a moisture barrier on one side comprising:

a frame, a plurality of rollers for moving a duct board to be cut through the machine, means for rotating the rollers, tool bar means extending across the machine parallel to the rollers, a support roller below the tool bar means, at least six cutter blade supports on the tool bar including at least four interior and two exterior supports, V-cut blade means on each of the interior blade supports spaced from said support rollers, first exterior blade means on one exterior blade support having a first section means adapted to be secured to the blade support, a second section means extending from the first section means at approximately a 54 degree angle in a first direction, a third section means extending from the second section means at approximately a 90 degree to the second section means in the opposite direction, and a forth section means extending from said third section at approximately a 54 degree angle to said third section means in said opposite direction, second exterior blade means on the other exterior blade support having a first section means adapted to be secured to the blade support, a second section means extending from the first section means at approximately an 54 degree angle to the first section means, and a third section means extending from the second section means at an angle perpendicular the first section means and in the opposite direction to the second section means, said exterior blade means constructed and arranged to have the V-sections provided by the blade means opening away from each other.

* * * * *